United States Patent [19]

Zalesky

[11] Patent Number: 5,335,758
[45] Date of Patent: Aug. 9, 1994

[54] ANTI-THEFT VEHICLE BRAKE SUPERVISING DEVICE

[76] Inventor: Dean R. Zalesky, 243 Oneida St., Denver, Colo. 80220

[21] Appl. No.: 51,081

[22] Filed: Apr. 21, 1993

[51] Int. Cl.⁵ ............................................. B60T 11/00
[52] U.S. Cl. .................................... 188/353; 188/265; 251/89
[58] Field of Search ................. 180/287; 188/265, 353; 251/89; 303/89; 70/176

[56] References Cited

U.S. PATENT DOCUMENTS

| 2,964,141 | 12/1960 | Schlumbrecht | 188/353 |
| 4,018,314 | 4/1977 | Richmond et al. | 188/353 |
| 4,040,675 | 8/1977 | Richmond et al. | 303/89 |
| 4,633,686 | 1/1987 | Carr | 188/353 |
| 4,881,615 | 11/1989 | Conway | 180/287 |
| 4,928,506 | 5/1990 | Radziewicz | 70/176 |

*Primary Examiner*—Robert J. Oberleitner
*Assistant Examiner*—Chris Schwartz

[57] ABSTRACT

A vehicle anti-theft device which upon activation, maintains the braking function of the braking fluid by preventing reverse flow thereof from the wheel cylinder back to the master cylinder once the brake pedal of the vehicle has been pushed. Improvements over prior art are; no brake fluid is trapped between the wheel cylinder and the one-way valve upon activation of the device until after the brake pedal of the vehicle has been pushed; no indication exists either with the switching device or with the mechanism itself, to indicate to other than to an authorized user, the state in which the valve is currently set.

4 Claims, 2 Drawing Sheets

ANTI-THEFT VEHICLE BRAKE SUPERVISING DEVICE

FIELD OF INVENTION

The present invention relates to a valve which operates as an anti-theft device for motor vehicles by maintaining the brakes in an engaged position by limiting the release of brake fluid pressure, once applied, from the brakes.

DESCRIPTION OF PRIOR ART

Automobile theft is an increasing problem in society which impacts not only on the owner of the stolen vehicle, but on all vehicle operators through increased insurance rates. A great deal of attention has been given to providing security for unattended motor vehicles. These methods have ranged from separate, hidden ignition locks often working in conjunction with sirens or alarms, steering wheel locking apparatus and hidden electrical cutoff switches.

Braking fluid-supervising devices for anti-theft purposes are already well known, as exemplified by the devices of U.S. Pat. Nos. 4,018,314-Apr. 19, 1977- and 4,040,675-Aug. 9, 1977- to Richmond; U.S. Pat. No. 4,881,615-Nov. 21, 1989- to Conway; U.S. Pat. No. 4,928,506-May 29, 1990- to Radziewicz U.S. Pat. No. 2,964,141-Dec. 13, 1960- to Schlumbrecht; and U.S. Pat. No. 4,633,686-Jan. 6, 1987- to Carr. In principle, a one-way flow valve is selectively introduced into the flow passage between the vehicle master and wheel cylinders by the application of a security device such as a lock or electrical switching device. Upon application of the brake, the brake fluid flows in the permitted direction through the valve into the wheel cylinder to immobilize the vehicle, but cannot reverse its flow unless the security device is operated to deselect the flow path containing the one-way valve. Known devices utilizing this principle are not entirely satisfactory because of one or more shortcomings;

(a) If the one-way valve is closed by means of a lock and tumbler device, such a valve could be rendered inoperable if the car thief had the appropriate master key or was able to tamper with the lock.

(b) Once it is determined that the aforementioned anti-theft valve is in a functional mode, the thief has only to locate the switching device and restore its state to the opposite of which it is found in order to restore braking function.

(c) Once the current devices are shifted to the active mode, hydraulic or brake fluid is trapped between the one-way valve and the wheel cylinder. Unless some way is provided to compensate for pressure changes on the hydraulic or brake fluid due to temperature variations as was done in the previously noted patents to Richmond in 1977, excessive pressures may result which could damage the wheel cylinders. In Richmonds patent however, failure of the relief spring renders the entire valve inoperable.

OBJECTS AND ADVANTAGES

The present invention relates generally to a vehicle anti-theft device, and more particularly to an improved device of the type that advantageously uses the vehicle braking fluid to prevent its movement, unless by an authorized user. Accordingly, several objects and advantages of the present invention are;

(a) to provide an anti-theft device which, if a lock and tumbler actuator is utilized, is not subject to deactivation simply through the utilization of a master key or lock pick to reset the lock to its previous condition;

(b) to provide an anti-theft device which when it is determined that the valve is in a functional mode, no specific indication exists for restoring the switch to its opposite state;

(c) to provide an anti-theft device which does not trap hydraulic or brake fluid between the wheel cylinder and the one-way valve until after the brake pedal has been manipulated.

Broadly, it is an object of the present invention to provide an improved braking-fluid-type anti-theft device overcoming the shortcomings of the prior art. Specifically, it is an object to provide a manually or electrically activated, fluid-operated valve closing and opening device for a vehicle braking fluid system, so that a selective and effective use can be made of the vehicle braking function either singularly or in combination with on-board vehicle computer functions for security purposes. Still further objects and advantages will become apparent from a consideration of the ensuing description and drawings.

DRAWING FIGURES

FIGS. 1-4 respectively illustrate tile improved anti-theft device according to the present invention in its various modes of operation. Each of the FIGS. 1-3 is a front elevation of the device in longitudinal section.

REFERENCE NUMERALS IN DRAWINGS

| | | | |
|---|---|---|---|
| 10 | valve body assembly | 12 | preformed seal |
| 14 | preformed seal | 16 | retaining ring |
| 18 | piston | 20 | preformed seal |
| 22 | preformed seal | 24 | valve housing |
| 26 | ring switch | 28 | cage |
| 30 | preformed seal | 32 | preformed seal |
| 34 | preformed seal | 36 | plug |
| 38 | ball | 40 | spring |
| 42 | spring retainer | 44 | inlet port |
| 46 | flow passage | 48 | bleed port |
| 50 | port | 52 | signal port |
| 54 | outlet port | 56 | outer surface |
| 58 | signal passage | 60 | actuating area |
| 62 | inside diameter | 64 | bore |
| 66 | first flow cavity | 68 | second flow cavity |
| 70 | bypass passageway | | |

DESCRIPTION—FIGS. 1 to 4

Figure 1:
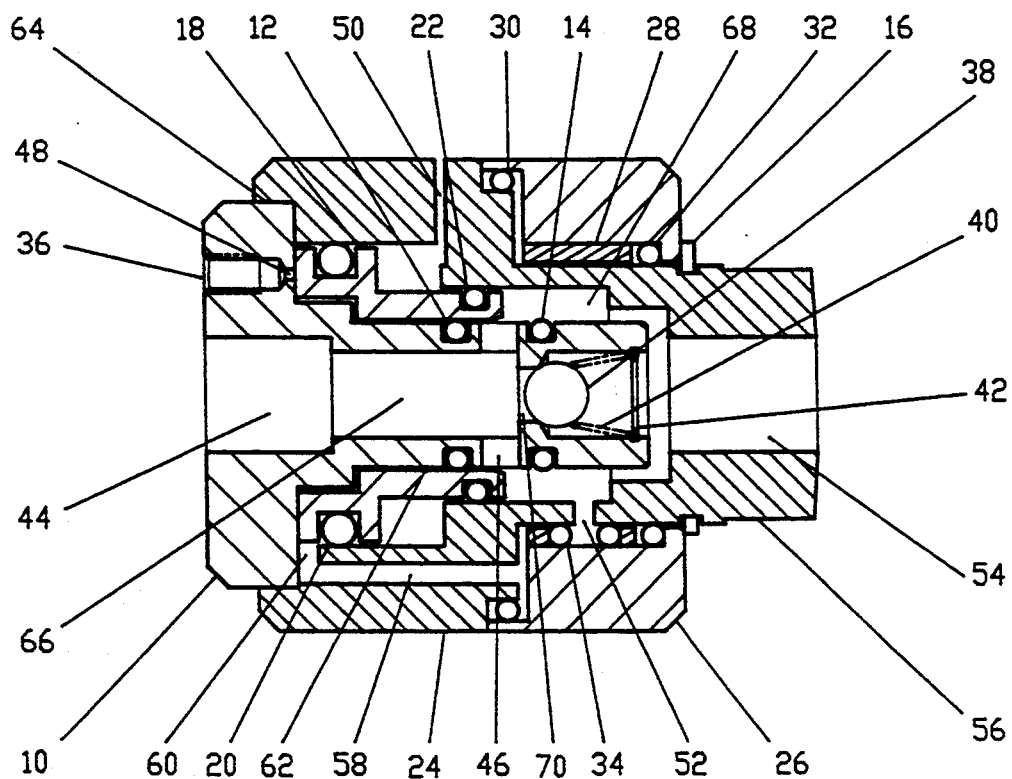
FIG. 1 shows the anti-theft device when it is non-operative.

Referring to FIG. 1, there is shown a side cross sectional elevational view of the anti-theft locking valve for use in conjunction with a fluid braking system. The anti-theft locking valve assembly comprises a valve body assembly 10 having an inlet port 44, for connection to the master brake cylinder or pressure generating brake actuator either directly or remotely by means of tubing, a first flow cavity 66, multiple flow passages 46, two preformed bi-directional seals 12 and 14 and a one way valve as represented by, but not limited to, ball 38, spring 40 and spring retainer 42. Onto valve body assembly 10 is assembled a piston 18 having further assembled thereon preformed seals 20 and 22. The inside diameter 62 of piston 18 is sized and finished to provide a leak-free, bi-directional, minimum-friction seal with preformed seals 12 and 14 which are part of valve body assembly 10. Valve body assembly 10 also contains bleed port 48 which is closed and sealed by plug 36.

Valve housing 24 is generally cylindrical in shape with multiple concentric bores therein. Bore 64 defines the interface with valve body assembly 20 and is sized to accept valve body assembly 10 either as a press fit or otherwise bonded. The next smaller concentric bore is diametrically sized to provide a sliding, sealing fit with preformed seal 20 on piston 18 and only long enough as to allow piston 18 to traverse a distance which will allow its inside diameter 62 to engage preformed seals 12 and 14 simultaneously thus blocking flow passage 46. A bleed port 50 to atmosphere is provided at the bottom of this bore to allow air which may become trapped between preformed seals 20 and 22 during operation of the anti-theft valve to escape.

Figure 3:
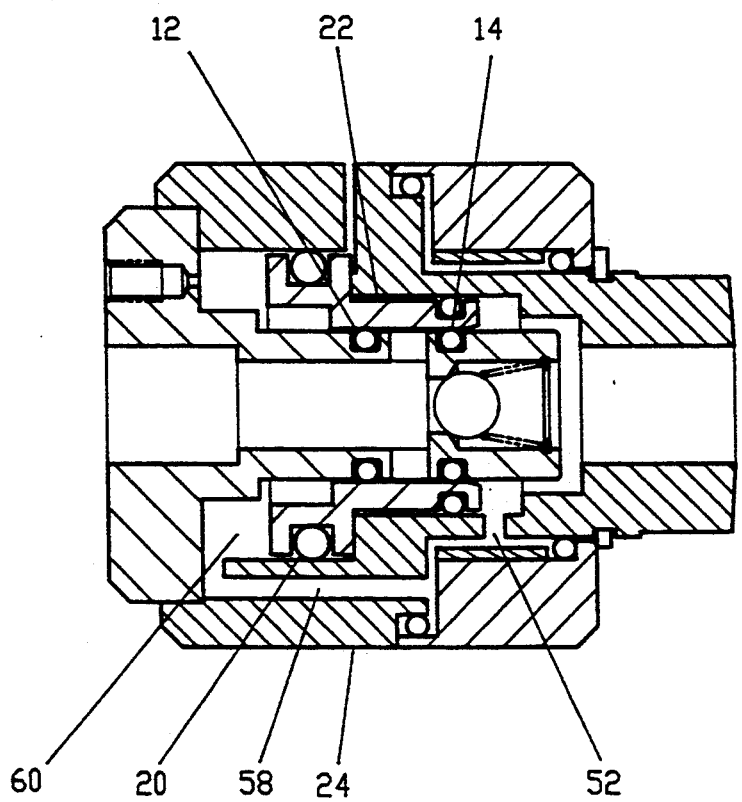
FIG. 3 shows the anti-theft device actuated.

The next concentric bore forms the second flow cavity 68. It is significantly smaller than the previously defined bore and is diametrically sized to provide for a sliding fit with preformed seal 22. It is of such a length as to allow the movement of piston 18 as previously defined as well as additional length to accommodate signal port 52 without possibility of signal port 52 being even partially blocked by piston 18 when in its actuated position. A signal passage 58 is provided in valve housing 24 to connect signal port 52 to actuating area 60 when the anti-theft valve is in the activated condition as best shown in FIG. 3.

Figure 4:
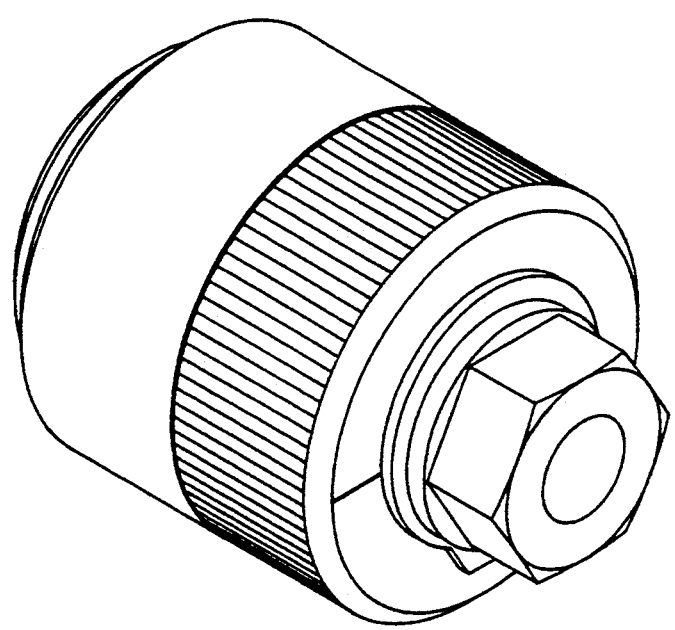
FIG. 4 shows the indicating mark of the switch ring and its relationship to a hex point.

The next smaller concentric bore is sized to provide unrestricted bi-directional flow for braking fluid from the second flow cavity 68 around the small end of valve body 10 and through outlet port 54 which is connected to one or more wheel cylinders or wheel brake actuators. The outer surface 56 concentric to port 54 is hexagonal as indicated in FIG. 4 or otherwise faceted to facilitate installation of the anti-theft valve. A secondary function of this faceting is to non-specifically indicate to the authorized operator of the vehicle, by the relationship of a facet to the scribed line on ring switch 26 as shown in FIG. 4, the state in which the anti-theft valve is currently set when the anti-theft valve assembly is self contained as shown.

Referring again to FIG. 1, ring switch 26 contains cage 28 which is permanently assembled therein. Cage 28 contains a properly sized bore which captures preformed seal 34 and is of such a length as to form the feature which retains preformed seal 32. The function of the bore which captures preformed seal 34 is to insure that preformed seal 34 moves with ring switch 26 when ring switch 26 is rotated about valve housing 24. Preformed seals 30 and 32 function to prevent brake fluid under pressure from leaking out to atmosphere between the two interfaces of valve housing 24 and ring switch 26. Retaining ring 16 functions to retain ring switch 26 onto valve housing 24 while still allowing ring switch 26 to rotate a full 360 degrees. Although the external surface of ring switch 26 is presented as being knurled in FIG. 4, other configurations which would lend themselves to electrical or mechanical drive means is obvious.

From the description above, a number of advantages of my anti-theft valve become evident;

(a) The most basic configuration as shown in FIG. 1 consists of only five machined parts thus minimizing manufacturing costs.

(b) The small size of the unit lends itself to concealment in the vehicle.

(c) External appearances alone yield no clue to the unauthorized user as to the state of the device and, if actuated, give no clue as to how to deactivate the unit.

(d) Since arming the device is done by rotating the ring from one position to any of an infinite number of positions, the unit is ideally suited to be controlled by present day on-board automotive computer systems.

OPERATION—FIGS. 1 to 4

Reference is made to FIG. 1 which shows the anti-theft valve assembly in its non-operative position. In this position, when the vehicles brake is actuated, fluid from the master brake cylinder enters the valve though inlet 44 into the first flow cavity 66, continues through flow passages 46 into the second flow cavity 68 and out to one or more wheel cylinders through outlet 54. Preformed seal 34 is blocking any flow or fluid pressure from communicating to actuating area 60 through signal port 52 and signal passage 58. Without this pressure, no force can be developed on the large diameter end of piston 18. Without this opposing force, piston 18 is driven into its withdrawn position as shown in FIG. 1 by any brake-generated pressure acting against the small end of piston 18. This prevents piston 18 from moving to block flow passages 46 and insures that bi-directional flow is maintained within the valve.

Figure 2:
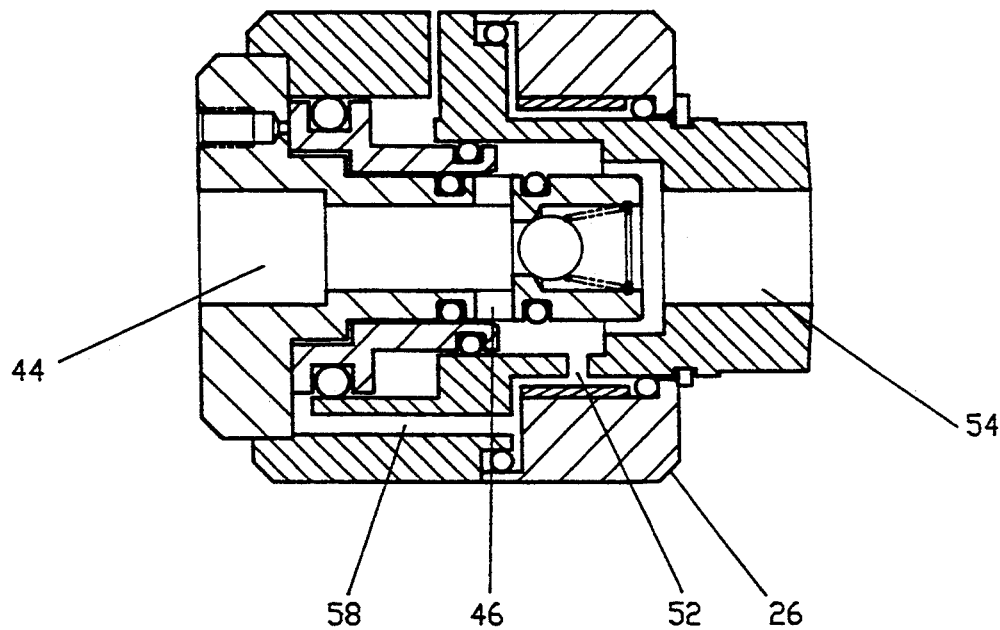
FIG. 2 shows the anti-theft device in an operative condition, but not actuated.

FIG. 2 illustrates the activated condition of the anti-theft valve assembly. Ring switch 26 has been rotated some amount by an authorized user after first noting the initial alignment of the scribed line on ring switch 26 with some feature such as the hex point shown in FIG. 4. Preformed seal 34 which was shown in FIG. 1 is carried along with the rotating ring switch 26 and no longer covers signal port 52. This opens up signal passage 58 to pressure and flow.

An open flow-path exists from the wheel cylinder back to the master cylinder through flow passages 46. Pressure increases due to temperature variations cannot occur since the hydraulic fluid is free to expand back into the master brake cylinder.

When the anti-theft valve is in its FIG. 2 position and the potential thief presses the brake pedal, the effect on the brake fluid is a uniform pressure increase with flow sufficient to move the wheel and piston 18. As shown in FIG. 3, this pressure passes through signal port 52 to signal passage 58 and finally into actuating area 60. Piston 18 now has the same brake generated pressure acting against both its large end and its small end at the same time resulting in an unbalanced force which will cause piston 18 to move into contact with preformed seal 14 blocking flow passages 46 between preformed seals 12 and 14. Any additional forces on the brake pedal must now result in pressure/flow being transmitted via the bypass passage way 70 through the one-way valve represented by ball 38, spring 40 and spring retainer 42 and out through outlet port 54 to the wheel cylinder(s). This pressure/flow is fed back to flow cavity 60 through signal port 52 and signal passage 58 via second flow cavity 68 to maintain the unbalanced force on piston 18 holding it in contact with preformed seal 14. Reverse flow is now not possible, the brakes are locked rendering the vehicle immobile.

In order to render the brakes again operative, one must first know the position of ring switch 26 which will cause signal port 52 to be blocked by preformed seal 34, thereby also blocking signal passage 58—refer to FIG. 1—and then move it into that position. Next, plug 36 must be temporarily removed from valve body assembly 10 exposing actuating area 60 to atmospheric pressure thru bleed port 48. The brake pedal must then be operated to generate a fluid pressure. Since signal port 52 is blocked, this pressure acts only against the small end of piston 18 creating a force which causes piston 18 to move toward actuating area 60 expelling the hydraulic fluid trapped therein to the atmosphere through bleed port 48. Plug 36 is then reinstalled and the master brake cylinder is refilled with fluid as required.

SUMMARY, RAMIFICATIONS, AND SCOPE

Thus the reader will see that the anti-theft valve of the invention is not subject to deactivation by a key or lock pick; cannot be restored to a functional mode merely by resetting it to a state which is opposite to that in which it is found; is economical to fabricate; is easily concealed within the vehicle and is adaptable to multiple means of activation and computer control.

Although the description above contains many specificities, these should not be construed as limiting the scope of the invention but as merely providing illustrations of some of the presently preferred embodiments of this invention. For example, the ring switch could be an external spur gear driven by a lock and tumbler device which is capable of multiple rotations through a flexible cable; the ring switch could be an external spur gear driven by an electric motor which is controlled by the vehicles computer security system; etc.

Thus the scope of the invention should be determined by the claims and their legal equivalents, rather than by the examples given.

I claim:

1. An anti-theft vehicle brake-supervising device adapted to be connected in a fluid actuated brake system between a pressure generating brake actuating member and at least one wheel brake actuator, said device selectively activated to prevent reverse flow of a fluid from said at least one wheel brake actuator back to the vehicles pressure generating brake actuating member to thereby maintain the braking function of said fluid within said wheel brake actuator, the improvement comprising a two-cavity flow chamber having a first fluid connection connected from a proximal end of a first flow chamber to said vehicle pressure generating brake actuating member, radially oriented first passageways and a bypass passageway having a one-way valve operatively place connecting said first flow chamber to a second flow chamber, a stepped piston having a small end with a preformed seal mounted thereon and a large end with a preformed seal mounted thereon, said small end being in constant communication with system pressure in said second flow chamber on one side of said preformed seal mounted thereon and vented to atmospheric pressure on the other side of said preformed seal by means of a port connecting the volume between said preformed seal on said large end of said piston and said preformed seal on said small end of said piston with atmospheric pressure, said piston slidably mounted with sufficient travel to move and block said first passageways when system fluid pressure and flow are allowed to communicate with a non-vented side of said preformed seal on said large end of said piston, preventing fluid flow from said first flow chamber to said second flow chamber except through said bypass passageway and said one-way valve, a second fluid connection connected from a distal end of said second flow chamber to said vehicle wheel brake actuator, said first and second fluid connections cooperating with said first passageway between said first and second flow chambers to allow opposite direction fluid flow between said vehicle pressure generating brake actuating member and said at least one wheel brake actuator through said first and second flow chambers, means to selectively allow or prevent fluid pressure and flow being directed to said non-vented side of said preformed seal on said larger end of said piston.

2. An improved anti-theft vehicle brake-supervising device as claimed in claim 1 wherein said means for selectively allowing or preventing fluid pressure and flow from communicating with said non-vented side of the preformed seal on said larger end of said piston comprises a ring which is free to rotate thorough a full 360 degrees and which contains a preformed seal, said preformed seal being disposed to move with said ring opening or blocking a passage connecting said second flow cavity to said non-vented side of the preformed seal on said larger end of said piston.

3. An improved anti-theft vehicle brake-supervising device as claimed in claim 2 wherein a surface of said ring is shaped as a gear so said ring may be driven through its 360 degrees of rotation by other means.

4. An improved anti-theft vehicle brake-supervising device as claimed in claim 3 wherein structure is provided on said anti-theft device to accommodate said means for driving said ring.

* * * * *